United States Patent [19]

Ramy et al.

[11] 4,176,244

[45] Nov. 27, 1979

[54] METALLURGICAL BONDED CONNECTOR FOR COAXIAL CABLES

[75] Inventors: Towheed Ramy, Jersey City; Lal M. Hore, Fanwood, both of N.J.

[73] Assignee: General Cable Corporation, Greenwich, Conn.

[21] Appl. No.: 831,415

[22] Filed: Sep. 8, 1977

[51] Int. Cl.² .......................................... H02G 15/08
[52] U.S. Cl. ............................... 174/88 C; 174/75 C
[58] Field of Search ............... 174/88 C, 21 C, 22 C, 174/75 C

[56] References Cited

U.S. PATENT DOCUMENTS 2,743,505  5/1956  Hill ..................................... 174/88 C

FOREIGN PATENT DOCUMENTS 601393  7/1960  Canada .................................. 174/88 C Primary Examiner—Roy N. Envall, Jr.
Attorney, Agent, or Firm—Roy C. Hopgood; John M. Calimafde; Charles W. Neill

[57] ABSTRACT

This invention is an improved connection for splicing or terminating coaxial cables. The connection of this invention maintains substantially the same ratio of outer conductor inside diameter to inner conductor outside diameter as in the rest of the cable, and thus avoids impairment of signals transmitted by the coaxial cable. The splices prevent moisture from entering the cable when used underground; and the splices are strong enough to permit the cable to be plowed in with no fear of splice hang-up in the plow guides.

10 Claims, 6 Drawing Figures

METALLURGICAL BONDED CONNECTOR FOR COAXIAL CABLES

BACKGROUND AND SUMMARY OF THE INVENTION

The main problem concerned the aluminum outer conductor oxide formation and flow, the latter under compression of connector forces. Other types of problems were high radiation of transmitted signal through gaps between the connector assembly and the cable outer conductor, or the introduction of unwanted signal transmitted through the air into the coaxial line. Imperfect seal was also responsible for moisture ingress into the cable which at times lead to low resistance shut between the inner and outer conductors and degradation of the transmitted signal.

Degradation of contact resistance with time in service, as well as ingress of moisture, limited the use of such cable to overhead installations, and in case of sufficient degradation in performance, visual inspections of the cable were made and connectors removed, which permitted removal of collected water, and then the line was re-connected to provide re-establishment of lower contact resistance.

There are many methods by which these mechanical connector problems can be avoided by using metallurgical bonds between the connector and the aluminum outer conductor. All these methods, however, present problems of their own because of high heat and damage to cable insulation, high pressure and damage to coaxial line (alteration of dimensions), high costs, non-portability of equipment, etc.

Fluxless soldering was used and it eliminated additional problems of possible corrosion. A Reynolds Aluminum Company method of fluxless soldering was found to be most suitable. A sleeve with internal diameter dimensions suitable for application over the given coaxial cable was ultrasonically pretinned (solder coated) and with the use of localized heat and pressure was made to solder to both ends of coaxial cables to be spliced. The same principle can be used for cable terminations. The method requires relative movement at the joint interface, and this provides physical disruption of oxides and allows joining to take place.

The shape of the sleeve depends on the method used, or the component configuration used for splicing of the center conductor. It is also a function of how the splices should be matched to the cable. For example, a crimped sleeve over the center conductor has proven reliability but only when applied over solid copper center conductor. The size of the sleeve has to be sturdy enough to have the crimped splice effective. If, however, a coaxial on hand uses a copper-clad aluminum conductor, a crimping method may not give reliable connection because of well-known cold flow of aluminum.

The invention connects the inner conductors of the coaxial cable together by a thin wall sleeve soldered to the conductor ends which are to be connected. By using a thin sleeve, there is no substantial increase in the outside diameter of the inner conductor. The ends of the outer conductor are connected by a sleeve which has opposite end portions that slip over the ends of the outer conductor that are to be connected, and this outer sleeve is somewhat thicker than the inner sleeve so as to provide a strength member which makes the splice as strong, or somewhat stronger, than the coaxial cable beyond the splice.

The inside diameter of the outer sleeve is slightly greater than that of the outer conductor, and it is correlated with the outside diameter of the inner sleeve to match the proportions of the inner and outer conductors from one another along other parts of the cable beyond the splice.

There is ordinarily some increase in the outside diameter of the coaxial cable at the splice; but this change is made without any abrupt shoulder which can catch on the ends of guide surfaces of apparatus used for plowing in the spliced cable. Thus the spliced cable can be plowed in without danger of having splices hang-up in the guides through which the cable has to pass on its way to the plow.

The invention provides a construction in which the coaxial cable can be protected from damage during soldering by heat sinks located in position to hold the parts firmly while soldering, and at the same time carry away heat from the location of the heat application.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
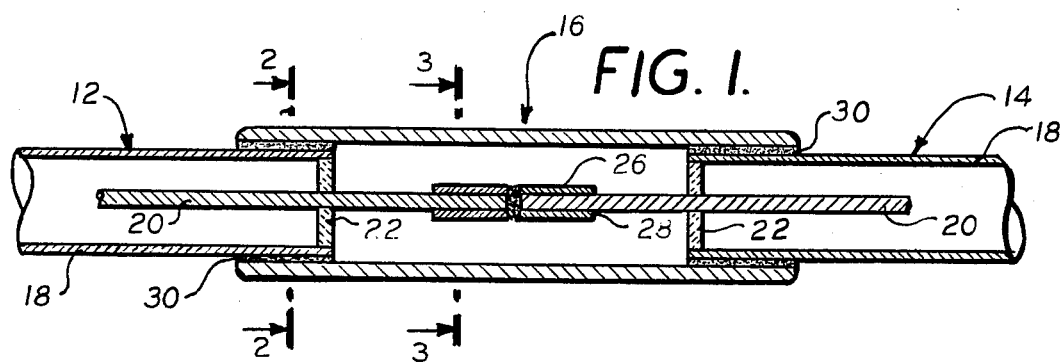
FIG. 1 is a sectional view through a coaxial cable splice made in accordance with this invention.

FIG. 1 shows a length 12 of coaxial cable connected to another length 14 of similar cable by a splice indicated generally by the reference character 16. Each length of coaxial cable includes an outer conductor 18 and an inner conductor 20. There are means for holding the inner conductor 20 in its coaxial relation with the end of the outer conductor 18. In FIG. 1 this means constitutes a ceramic disc 22. Other spaced discs in the coaxial cable, at spaced locations along the length of the cable, are made of plastic and preferably fused to the inner conductor 20 and also to the outer conductor 14. Similar discs 22 are located at evenly spaced positions along the length of the coaxial cable, and the spacing between the plastic is preferably about 1/40th of the wavelength of the signal being transmitted by the coaxial cable.

Figure 5:
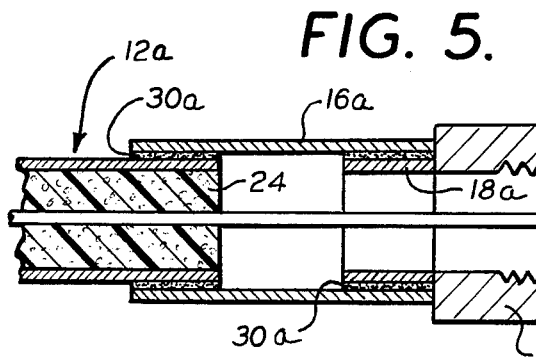
FIG. 5 is a sectional view, similar to FIG. 1 but showing a termination instead of a splice, and showing foam insulation instead of spacer discs.

Other means for holding the center conductor 22 in its coaxial relation with the outer conductor 18 may be foamed plastic 24, as shown in FIG. 5, which is adhered to both the inner and outer conductors of the cable.

In order to make the splice of this invention, the outer conductors 12 and 14 are trimmed back for some distance from the ends of the inner conductors 20 and preferably to a location where there is a disc 22 for maintaining the concentricity of the conductors at the splice.

The inner conductors 20 are connected by an inner sleeve 26 which has its inner surface coated with a low melting point solder, as indicated by the heavy black line between the inside surface of sleeve 26 and the outside surfaces of the inner conductors 20.

The inner sleeve 26 is a close fit over the inner conductors 20 and is placed over the conductors 20 so that the conductors meet at the approximate axial center of the sleeve 26. Heat is then applied, and the solder 28 is melted. When the solder hardens, the conductors 20 are metallurgically bonded to the sleeve 26 so that as far as the transmission of energy is concerned, the inner conductors are, in effect, bonded to one another.

The sleeve 26 is preferably made with a thin wall so that the inner conductors, where they are connected by the sleeve 26, are not of significantly greater diameter than at other portions of the coaxial cable. The metallurgical bonding of the conductors 20 and the sleeve 26 is particularly advantageous in that it permits the use of a thin sleeve, as opposed to a crimped connection, and the low resistance of the connection is maintained over long periods, which is not true of crimped connections where the metal is subject to cold flow as in the case of copper-clad aluminum inner conductors.

The outer sleeve 16 is preferably placed over one of the outer conductors 12 or 14 before the inner sleeve 26 is metallurgically bonded to the inner conductors 20. After the inner conductors are connected, as described, the outer sleeve 16 is moved along the length of the outer conductor which it surrounds and into position overlapping the end portions of both of the conductors 12 and 14, substantially equally, as shown in FIG. 1.

Both end portions of the sleeve 16 are coated with low temperature solder 30 which fills the clearance between the inside diameter of the sleeve 16 and the outside diameter of the outer conductors 12 and 14. This solder is fused, as will be explained more fully in connection with FIG. 6, and provides metallurgical bonding of the sleeve 16 to the end portions at each of the outer conductors 12 and 14. The outer sleeve 16 is thick enough and strong enough to provide a connection between the cable lengths 12 and 14, which is at least as strong, and preferably somewhat stronger, in tension than are the lengths of cable 12 and 14.

In order to obtain the desired tensile strength in the outer conductor 16, it is necessary that this outer conductor be of substantially greater wall thickness than the inner conductor 26. However, the thickness of the outer conductor 16 does not have any effect upon the ratio of the inner diameter of the outer conductor to the outer diameter of the inner conductor; this being an important consideration in coaxial cables, because any substantial change in this ratio at any location along the length of the cable produces distortion in the signals being transmitted by the coaxial cable.

An important consideration, however, in the thickness of the outer sleeve 16, is that it should have no abrupt shoulders of substantial radius that could catch on entrances to guides through which the coaxial cable must pass when being plowed in for underground installations. If the end faces of the outer sleeve 16 have radial extent sufficient to produce possible hang-ups in the guides of the plowing in apparatus, these end faces can be bevelled off or rounded, as shown in FIG. 1. Ordinarily, this is not necessary because of the small size of such cables.

Figure 2:
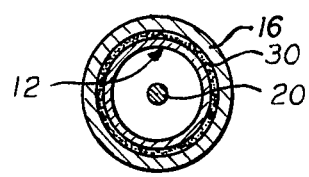
FIG. 2 is a sectional view taken on the line 2—2 of FIG. 1.
Figure 3:
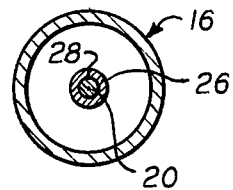
FIG. 3 is a sectional view taken on the line 3—3 of FIG. 1.

FIG. 2 is a sectional view on the line 2—2; and FIG. 3 is a sectional view on the line 3—3.

Figure 4:
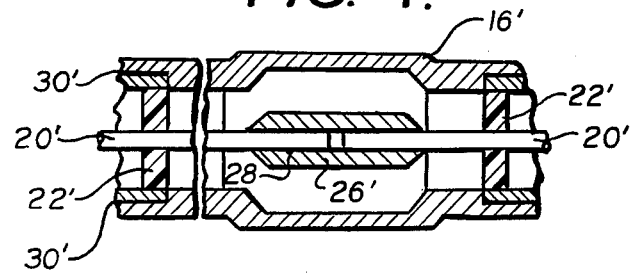
FIG. 4 is a sectional view, similar to FIG. 1 but showing a modified construction in which a heavier sleeve is used to connect the inner conductors at the splice.

FIG. 4 shows a special construction where inner conductors 20' are connected together by a sleeve 26', all parts in FIG. 4 corresponding with parts in FIG. 1 being indicated by the same reference character with a prime appended. Because of the great increase in the outside diameter of the inner conductor of the coaxial cable at the sleeve 26', it is necessary to shape the outer sleeve 16' so that the portion of the inner diameter that surrounds the sleeve 26' is of sufficiently increased radius to maintain substantially the same ratio of inside diameter of the outer sleeve to outside diameter of the center conductor as exists at other portions of the coaxial cable beyond the splice.

FIG. 5 shows a termination fitting where a terminal splice is used which is similar to the splice of the outer conductors shown in FIG. 1. Parts corresponding to those shown in FIG. 1 are indicated by the same reference character in FIG. 5 with a letter a appended. A terminal fitting 34 includes a threaded end member 36 having an inside diameter equal to that of the outer conductor 12a; and there is a length of outer conductor 18a spaced from the end of the length of cable 12a; but at the terminal fitting, the outer conductor of the length of cable 12a is trimmed back far enough so that the inner conductor 20a extends through the terminal fitting 34, and no splice in the inner conductor is required for the construction illustrated in FIG. 5.

An outer conductor 16a connects the outer conductor of the cable length 12a to the length of outer conductor 18a attached to the end fitting 36. Solder 30a on the inside of the outer conductor sleeve 16a metallurgically bonds the length of cable 12a to the terminal fitting 34. Thickness of the solder 30 in FIG. 1 and 30a in FIG. 5 is exaggerated for clearer illustration.

Figure 6:
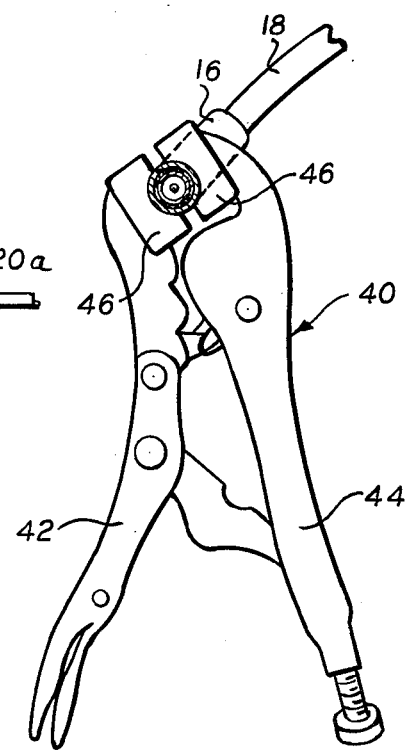
FIG. 6 is a view showing a tool for making the splices and terminations of this invention.

FIG. 6 illustrates, on a reduced scale, the way in which the outer sleeve 16 is secured to the outer conductor 18. A special tool 40 has handles 42 and 44 which are used to bring jaws 46 into contact with the outside surfaces of the sleeve 16 at the regions where the sleeve overlaps the outer conductors of the lengths of cable to which the sleeve is to be connected. The jaws are heated before being applied to the cable on both sides of the sleeve at the cable overlap and the heat fuses the solder 30, 30' or 30a.

This special tool 40 obtains a very high leverage and can be used to crimp the sleeve 16 to the outer conductors of the lengths of cable in addition to the metallurgical bonding of the outer conductor to the lengths of coaxial cable.

Even if the tool is not applied with enough force to crimp the sleeve to the outer conductors, it heats the sleeve 16 sufficiently to melt the low melting point solder that forms the metallurgical bond.

Heat sinks are applied to the cable on both sides of the sleeve to prevent heat transfer throughout the cable body and consequently damaging the insulation inside the cable.

In the case of FIG. 5. the same tool 40, shown in FIG. 6, can be used to solder the sleeve 16a to the length of cable 12a and to the outer conductor 18a of the terminal fitting 34.

The preferred constructions shown in FIGS. 1 and 5 have the advantage that the outer connector sleeves 16 and 16a can be made from sections of tubing which can be cut to length from long lengths of tubing. This makes possible the production of the sleeves at very small cost as compared to sleeves of specialized shape, as shown in FIG. 4.

The preferred embodiments of the invention have been illustrated and described, but changes and modifications can be made and some features can be used in different combinations without departing from the invention as defined in the claims.

What is claimed is:

1. A coaxial cable connection for joining the ends of lengths of coaxial cable that have a center inner conductor, an outer aluminum conductor, and means for holding the inner and outer conductors in coaxial relation with one another including in combination an end of one outer conductor which is spaced longitudinally back from an end of an inner conductor of said cable, an outer conductor sleeve with opposite end portions that are constructed to extend around the outside and confront the circumference of the outer conductor of one of said lengths of cable, and similarly around the outside of the outer conductor of said other length of cable that is spaced from the first length of cable, the connector sleeve having the final shape to join the cable ends before being brought to the cables, at least one of the confronting faces of the sleeve and outer conductor at each end of the sleeve being coated with a metallurgical bonding agent which is subjected to heat when in the final assembled position, said bonding agent having a fusion temperature that does no damage to the insulation within the cable, so that the connector sleeve is metallurgically bonded to the outer face of both of the outer conductors, and the length of the outer conductor sleeve extends beyond the ends of the outer conductors that are spaced back axially from the inner conductors of the coaxial cable.

2. The coaxial cable connection described in claim 1 characterized by the outer conductor sleeve being of uniform inside diameter along its length that spans the distance between the spaced ends of the outer conductors and the portions of the outer conductors that extend into said sleeve being free of metal enclosed therein other than the inner conductor.

3. The coaxial cable connection described in claim 1 characterized by the outer conductor structure beyond the connector sleeve being an outer conductor of another length of coaxial cable that is to be spliced to the first length of coaxial cable, and an outer sleeve with one end that fits over the end of the inner conductor of the first coaxial cable and another end that fits over the end of an inner conductor of the other length of coaxial cable, the inner sleeve being metallurgically bonded to both of the inner conductors over which it extends, and the inner sleeve being of substantially less radial thickness than the outer sleeve and being of uniform outside diameter throughout its length and having a ratio of the inside diameter of the outer connector sleeve to the outside diameter of the inner sleeve substantially equal to the ratio of the inner diameter of the outer conductors to the outer diameter of the inner conductors of the coaxial cable beyond the splice.

4. The coaxial cable connection described in claim 3 characterized by the inner sleeve being made of copper and the outer sleeve being made of aluminum, and the sleeves being metallurgically bonded to the respective conductors by low-temperature solder that is on their faces, which are to be soldered, prior to assembly of the sleeves with the respective conductors.

5. The coaxial cable connection described in claim 3 characterized by means for holding the inner and outer conductors in coaxial relation with one another being insulation in the outer conductors adjacent to the ends of the outer conductors that are connected by the outer sleeve.

6. The coaxial cable connection described in claim 5 characterized by the insulation being plastic discs secured to the inner conductor and spaced from other insulating discs by substantially the same distance as other discs in the coaxial cables are spaced from one another along the inside conductor.

7. The coaxial cable connection described in claim 5 characterized by the insulation in one of the coaxial cables being a foamed plastic filling the space between the inner and outer conductors.

8. The coaxial cable connection described in claim 1 characterized by the outer sleeve being aluminum and being also metallurgically bonded to the outer conductor.

9. The coaxial cable connection described in claim 3 characterized by the inner sleeve being of substantial radial thickness so that it increases substantially the effective diameter of the inner conductor along its length, said inner sleeve tapering at both ends to an outside diameter equal to that of the inner conductors, and the outer sleeve having its inner surface, that surrounds the inner sleeve, of enlarged diameter along its length that corresponds to the length of the inner sleeve and with corresponding tapered surfaces, so as to make the ratio of the inside diameter of the outer sleeve to the outside diameter of the inner sleeve substantially equal to the corresponding ratio of the inner diameter of the outer and the outer diameter of the inner conductors along their length beyond the connector sleeves.

10. The method of making a coaxial cable connection which comprises trimming back the end of an outer conductor so that an inner conductor of the coaxial cable extends beyond the outer conductor in an axial direction, passing a solid and fixed dimension sleeve, of a connector, over the end portion of the outer conductor so that it confronts the outside surface of the outer conductor in substantial contact therewith, bringing another coaxial cable outer conductor into the other end of the connector with the inside surface of the connector surrounding and substantially contacting with the outside surface of the second outer conductor and with said outer conductors axially spaced from one another for a substantial longitudinal distance within the connector sleeve, pre-coating at least one of the confronting faces at opposite ends of the connector sleeve, the outer conductor of the coaxial cable being made of aluminum, and metallurgically bonding the connector sleeve to the outer surface of the outer conductor of the coaxial cable by the application of heat and at a temperature at the bond which does not raise insulation of the coaxial cable to a value high enough to damage said insulation.

* * * * *